(12) United States Patent
Hughes (10) Patent No.: US 8,836,727 B2
(45) Date of Patent: Sep. 16, 2014

(54) SYSTEM LEVEL GRAPHICS MANIPULATIONS ON PROTECTED CONTENT

(75) Inventor: Gregory F. Hughes, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 937 days.

(21) Appl. No.: 12/976,982

(22) Filed: Dec. 22, 2010

(65) Prior Publication Data

US 2012/0162264 A1 Jun. 28, 2012

(51) Int. Cl.
*G09G 5/00* (2006.01)
*G09G 5/36* (2006.01)
*G06T 11/00* (2006.01)

(52) U.S. Cl.
CPC ..................................... *G06T 11/00* (2013.01)
USPC .......................................... 345/660; 345/545

(58) Field of Classification Search
CPC ............ G09G 5/00–5/008; G09G 5/36–5/366; G06F 13/00; G06F 15/167; G06F 12/02–12/0292
USPC ........................... 345/536, 541–545, 619, 660
See application file for complete search history.

(56) References Cited

U.S. PATENT DOCUMENTS

| 5,877,762 | A | 3/1999 | Young | |
|---|---|---|---|---|
| 6,788,309 | B1* | 9/2004 | Swan et al. | 345/629 |
| 6,958,759 | B2 | 10/2005 | Safadi et al. | |
| 7,106,275 | B2 | 9/2006 | Brunner et al. | |
| 7,330,922 | B2 | 2/2008 | Paquette et al. | |
| 7,761,713 | B2 | 7/2010 | Baar | |
| 7,800,636 | B2* | 9/2010 | Sinclair et al. | 345/660 |
| 8,275,218 | B2* | 9/2012 | Lin et al. | 382/299 |
| 2001/0019331 | A1* | 9/2001 | Nielsen et al. | 345/542 |
| 2008/0030520 | A1 | 2/2008 | Dyke et al. | |
| 2010/0079492 | A1 | 4/2010 | Nakamura | |

\* cited by examiner

*Primary Examiner* — Jacinta M Crawford
(74) *Attorney, Agent, or Firm* — Blakely, Sokoloff, Taylor & Zafman LLP (57) ABSTRACT

At least certain embodiments of the present disclosure include a method to manipulate graphics with protected content. In some embodiments, a composite engine of a computing system retrieves data within a region within a frame buffer holding pixels of an image displayed on a display device of the computing system. The region corresponds to an area of interest within the image, and the data retrieved includes pixels forming a portion of the image in the area of interest and protected content associated with the image. The composite engine may re-composite the area of interest with the pixels retrieved to produce an enlarged version of the portion of the image in the area of interest, without exposing the protected content to applications outside of the window server.

20 Claims, 9 Drawing Sheets

SYSTEM LEVEL GRAPHICS MANIPULATIONS ON PROTECTED CONTENT

TECHNICAL FIELD

This disclosure relates to graphics manipulations.

BACKGROUND

Conventionally, content providers of digital graphics or video content provide pixel information of digital graphics or video content under one or more predetermined agreements to window servers of computing systems. For example, the window servers may have agreed to keep the digital graphics or video content provided safe, and thus, preventing unauthorized copying of the digital graphics or video content provided. Such pixel information of digital graphics or video content is referred to as protected information. During processing and rendering of the digital graphics or video content on a user's computing system, a pixel client running on the computing system, such as a window server, receives pixel information from a content-providing application and actually draws images based on the pixel information received. Sometimes, the pixel client transfers the pixel information received to another application for further processing, such as zooming. Because the pixel information being transferred out of the pixel client is susceptible to unauthorized manipulation (e.g., unauthorized copying) by a third party application, the pixel client typically withholds protected content from being transferred out. As a result, the pixel client chooses not to display some information in an effort to protect it. For example, the pixel client chooses to omit certain copyrighted content (e.g., an image from a movie) from a screenshot, or prevents protected content from being sent to an external recording device.

SUMMARY OF THE DESCRIPTION

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

At least certain embodiments include an environment with a calling software component interacting with a called software component through an API. A method for operating through an API in this environment includes transferring one or more function calls, messages, other types of invocations or parameters via the API.

Some embodiments of the present disclosure include a method for system level graphics manipulations on images having protected content. In one embodiment, a composite engine, running on a window manager of a computing system, composites pixel information of a region of interest within an image in a first buffer. The composite engine then composites pixel information of the image and the pixel information of the region of interest from the first buffer in a second buffer to render the image with an enlarged view of the region of interest, without exposing the pixel information of the region of interest outside of the window manager.

Some embodiments of the present disclosure include an apparatus for system level graphics manipulations on images having protected content. In one embodiment, the apparatus includes a computer-readable storage medium to store a frame buffer and a secondary buffer. The apparatus further includes a graphics processing device to run a window manager to copy pixel information of a region of interest within an image into the secondary buffer, and to composite pixel information of the image with the pixel information of the region of interest from the secondary buffer in the frame buffer to render the image with an enlarged view of the region of interest.

Various devices which perform one or more of the foregoing methods and machine-readable media which, when executed by a processing system, cause the processing system to perform these methods, are also described.

Other methods, devices and computer-readable storage media are also described.

BRIEF DESCRIPTION OF THE DRAWINGS

The disclosure is described by way of example with reference to the accompanying drawings, wherein.

DETAILED DESCRIPTION

Various embodiments and aspects of the disclosure will be described with reference to details discussed below, and the accompanying drawings will illustrate the various embodiments. The following description and drawings are illustrative of the disclosure and are not to be construed as limiting the disclosure. Numerous specific details are described to provide a through understanding of various embodiments of the present disclosure. However, in certain instances, well-known or conventional details are not described in order to provide a concise discussion of embodiments of the present disclosure.

Some portions of the detailed descriptions, which follow, are presented in terms of algorithms which include operations on data stored within a computer memory. An algorithm is generally a self-consistent sequence of operations leading to a desired result. The operations typically require or involve physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The present disclosure can relate to an apparatus for performing one or more of the operations described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), flash memory, magnetic or optical cards, or any type of media suitable for storing electronic instructions, and each coupled to a bus.

A machine-readable medium includes any mechanism for storing or transmitting information in a form readable by a machine (e.g., a computer). For example, machines store and communicate (internally and with other devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.).

At least certain embodiments of the present disclosure include one or application programming interfaces in an environment with search software interacting with a software application. Various function calls or messages are transferred via the application programming interfaces between the search software and software applications. Transferring the function calls or messages may include issuing, initiating, invoking or receiving the function calls or messages. Example application programming interfaces transfer function calls to implement various operations (e.g., search, networking, service discovery, etc.) for a device having a display region. An API may also implement functions having parameters, variables, or pointers. An API may receive parameters as disclosed or other combinations of parameters. In addition to the APIs disclosed, other APIs individually or in combination can perform similar functionality as the disclosed APIs.

The display region may be in a form of a window. A window is a display region which may or may not have a border and may be the entire display region or area of a display. In some embodiments, a display region may have at least one window and/or at least one view (e.g., web, text, or image content). The methods, systems, and apparatuses disclosed can be implemented with display regions, windows, and/or views.

At least certain embodiments of the disclosure may be part of a portable electronic device, such as a digital media player (e.g., a portable music and/or video media player), which may include a media processing system to present the media, a storage device to store the media and may further include a radio frequency (RF) transceiver (e.g., an RF transceiver for a cellular telephone) coupled with an antenna system and the media processing system. In certain embodiments, data stored on a remote storage device may be transmitted to the portable electronic device through the RF transceiver. The data may be, for example, one or more of music or other audio, still pictures, or motion pictures, etc.

The portable media player may include a media selection device, such as a click wheel input device on an iPod® or iPod Nano® media player from Apple Computer, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone (s). In some embodiments, the display device and input device are integrated while in other embodiments the display device and input device are separate devices.

Embodiments of the disclosure described herein may be part of other types of data processing systems, such as, for example, entertainment systems or personal digital assistants (PDAs), or general purpose computer systems, or special purpose computer systems, or an embedded device within another device, or cellular telephones which do not include media players, or multifunctional touch tablet devices, or other multifunctional touch devices, or devices which combine aspects or functions of these devices (e.g., a media player, such as an iPod® portable media player, combined with a PDA, an entertainment system, and a cellular telephone in one device, an iPhone®). Because these devices generally have multiple functionalities, these devices may also be referred to as multifunctional devices hereinafter. In this disclosure, electronic devices and consumer devices are types of devices.

In some embodiments, a platform provides various search, service discovery, and networking operations. The platform includes hardware components and an operating system. The hardware components may include a processing unit coupled to an input panel and a memory coupled to the processor. The operating system includes one or more programs that are stored in the memory and configured to be executed by the processing unit. One or more programs include various instructions for transferring function calls or messages through an Application Programming Interface (API) in order to perform various search, service discovery, and networking operations.

One or more APIs may be used in some embodiments. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and pass data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however, the API may be implemented in terms of a specific programming language. An API-calling component can, in one embedment, call APIs from different providers such as a set of APIs from an OS provider and another set of APIs from a plug-in provider and another set of APIs from another provider (e.g. the provider of a software library) or creator of the another set of APIs.

Figure 1:
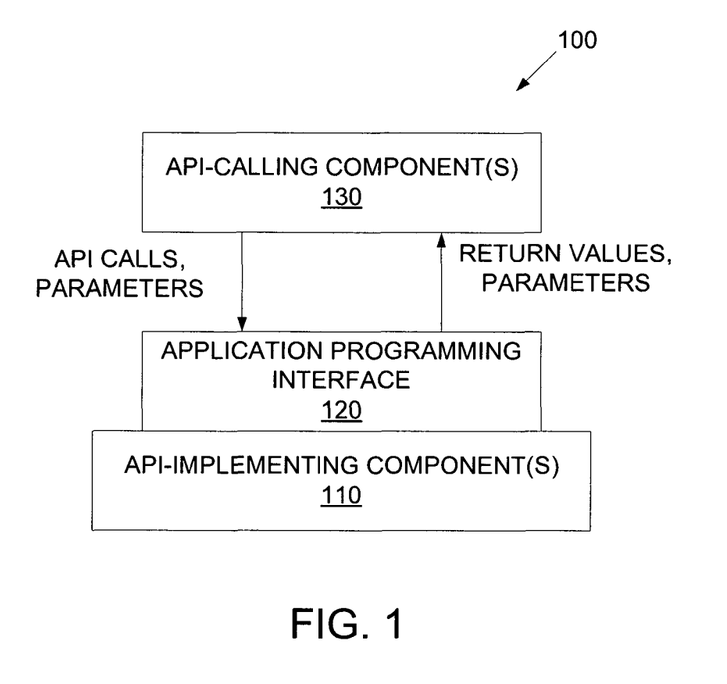
FIG. 1 illustrates a block diagram of an exemplary API architecture usable in some embodiments of the invention.

FIG. 1 is a block diagram illustrating an exemplary API architecture, which may be used in some embodiments of the invention. As shown in FIG. 1, the API architecture 100 includes the API-implementing component 110 (e.g., an operating system, a library, a device driver, an API, an application program, software or other module) that implements the API 120. The API 120 specifies one or more functions, methods, classes, objects, protocols, data structures, formats and/or other features of the API-implementing component that may be used by the API-calling component 130. The API 120 can specify at least one calling convention that specifies how a function in the API-implementing component receives parameters from the API-calling component and how the function returns a result to the API-calling component. The API-calling component 130 (e.g., an operating system, a library, a device driver, an API, an application program, software or other module) makes API calls through the API 120 to access and use the features of the API-implementing component 110 that are specified by the API 120. The API-implementing component 110 may return a value through the API 120 to the API-calling component 130 in response to an API call.

It will be appreciated that the API-implementing component 110 may include additional functions, methods, classes, data structures, and/or other features that are not specified through the API 120 and are not available to the API-calling component 130. It should be understood that the API-calling component 130 may be on the same system as the API-implementing component 110 or may be located remotely and accesses the API-implementing component 110 using the API 120 over a network. While FIG. 1 illustrates a single API-calling component 130 interacting with the API 120, it should be understood that other API-calling components, which may be written in different languages (or the same language) than the API-calling component 130, may use the API 120.

The API-implementing component 110, the API 120, and the API-calling component 130 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 2:
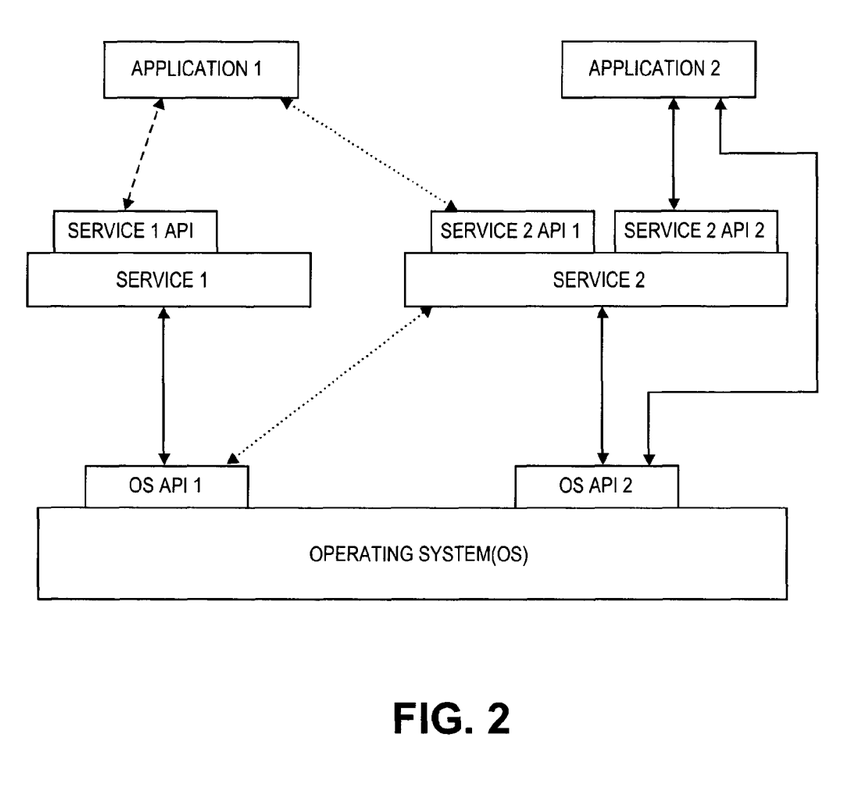
FIG. 2 is an exemplary embodiment of a software stack usable in some embodiments of the invention.

In FIG. 2 ("Software Stack"), an exemplary embodiment, applications can make calls to Services 1 or 2 using several Service APIs and to Operating System (OS) using several OS APIs. Services A and B can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Figure 3A:
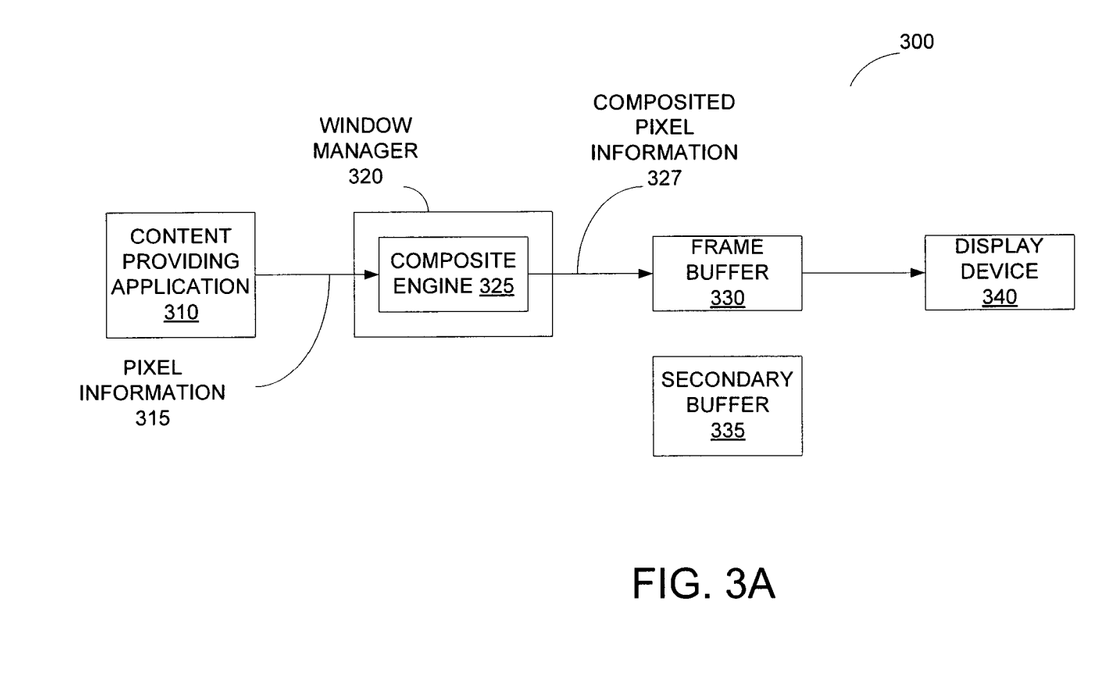
FIGS. 3A and 3B illustrate one embodiment of an architecture to manipulate an image from a content providing application.
Figure 3B:
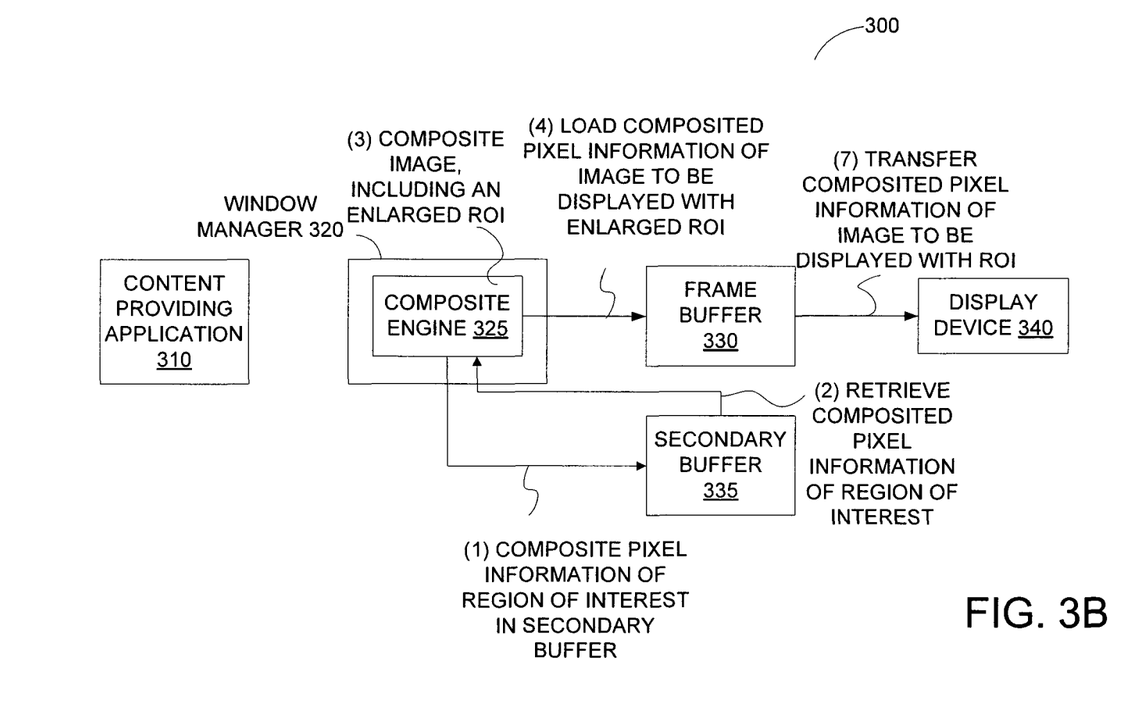

FIGS. 3A and 3B illustrate one embodiment of architecture to manipulate an image from a content providing application. The architecture 300 may be implemented on a computing system, such as, for example, a server, a personal computer, a laptop computer, a handheld multi-functional device (e.g., a personal digital assistant, a smart phone, etc.), a portable or handheld digital media player, etc. One exemplary embodiment of a computing system is shown in details in FIG. 7. Note that the architecture may include additional components not shown in FIGS. 3A and 3B in different embodiments. In some embodiments, the architecture 300 includes a content providing application 310, a window manager 320 including a composite engine 325, a frame buffer 330, a secondary buffer 335, and a display device 340.

Generally speaking, window manager 320 determines which display regions (e.g., windows) or views to display, and controls the placement and appearance of display regions and/or views in a graphical user interface (GUI) of the computing system. In addition to display regions and views related to the computing system, window manager 320 may provide for display regions and views controlled by other applications, including third party user applications (e.g., content providing application 310) on the computing system. In the case of an application, window manager 320 may request that display data, such as pixel information, from the application be sent directly to window manager 320. Note that for security reasons, window manager 320 can be isolated from user applications. Instead of direct access, user applications may have to access window manager 320 indirectly using proxy objects and remote procedure calls (RPCs). Details of some embodiments of a window manager and interaction between a window manager and applications are described in U.S. patent application Ser. No. 12/405,202, filed Mar. 16, 2009, which is published U.S. application no. 2010/0235777 and which is herein incorporated by reference in its entirety. In some embodiments, window manager 320 may be implemented with system software integrated in the operating system (OS) of the computing system. Window manager 320 can run on a graphics processing device (a.k.a. a graphics processor or a graphics processing unit (GPU)). Window manager 320 can be considered a window server, such as the window server used in Mac OSx, which is an operating system from Apple Inc. of Cupertino, Calif. Window manager 320, in one embodiment, acts as an intermediary between one or more applications that provide content for display (such as content providing application 310) and the graphics display sub-system which includes one or more frame buffers that drive one or more displays; in this architecture, these applications which provide content cannot directly write display data to the frame buffer, but rather provide their display data to window manager 320 which processes and composites the display data from these one or more applications and then loads the pixel data into the one or more frame buffers. Window manager 320 can operate in its own memory space which is reserved for its use and is independent of the memory space reserved for use by these one or more applications.

In some embodiments, content providing application 310 is communicably connected to window manager 320 and composite engine 325 within window manager 320. In general, content providing application 310 provides content to users of the computing system. The content provided typically can include video and audio. For example, the content may include a movie clip, a music video, a digital photograph, etc. Thus, the content typically can include pixel information 315 of images within the content. Content providing application 310 sends pixel information 315 to window manager 320. Other content providing applications can also send pixel information for their applications to window manager 320. Furthermore, the content may include protected content, which may be restricted in use, viewing, sharing, copying, etc., under one or more agreements between a source of the content and a provider of content providing application 310. For instance, the protected content may include digital right management (DRM) information (e.g., copyright information, licensing information, etc.) of the content. Such protected content is also sent from content providing application 310 to window manager 320 with an indication to window manager 320 that the content is protected. One example of content providing application 310 is iTunes provided by Apple Inc. of Cupertino, Calif.

In some embodiments, window manager 320 includes composite engine 325, which is responsible for compositing pixel information of images into the applicable format of frame buffer 330. The composite engine 325 can composite together the images from various applications and various windows controlled by those applications to create a composite image that is loaded into frame buffer 330 for display. Then composite engine 325 loads frame buffer 330 with the composited pixel information 327. From frame buffer 330, the composited pixel information 327 may be transferred to, or scanned into, display device 340. Display device 340 can display the image represented by the composited pixel information from frame buffer 330. Display device 340 can be, for example, a liquid crystal display (LCD) device.

When viewing the image on display device 340, a user of the computing system may desire to manipulate the image, for instance, to magnify or zoom into a particular region of interest within the image displayed. The user may input a request to magnify or zoom into the region of interest within the image using a user input device (not shown) of the computing system, such as, for example, a mouse, a keyboard, a touch screen, a touchpad, etc. In response to the request, composite engine 325 may perform the following operations to manipulate the image without exposing the protected content of the image to applications external to window manager 320.

Referring to FIG. 3B, composite engine 325 may composite pixel information of the region of interest in secondary buffer 335 (1). Note that in the current example, the region of interest is to be enlarged or zoomed into. Thus, the secondary buffer 335 can also be referred to as a zoom buffer. Then composite engine 325 retrieves the pixel information of the region of interest from secondary buffer 335 (2). Next, composite engine 325 composites pixel information of the image and combines it with the pixel information of the region of interest from secondary buffer 335 (3). At this stage, composite engine 325 enlarges the region of interest. Then composite engine 325 loads the composited pixel information into frame buffer 330 (4). The composited pixel information is then transferred from frame buffer 330 to display device 340 (5), which displays the image with an enlarged view of the region of interest. In some embodiments, composite engine 325 may further perform other operations to manipulate or enhance the image before, during, or after re-composition of the pixel information. Some examples of the other operations to manipulate the image include filtering, dithering, contrast enhancement, or other image enhancement operations.

In some embodiments, the user may have requested to have the magnified region of interest to occupy the entire display region on a display panel of display device 340, and hence, the image composited in frame buffer 330 may contain only pixel information of the enlarged view of the region of interest. Alternatively, the user may have requested to have the magnified region of interest to occupy only a portion of the display region (e.g., the top left corner of the display region), and hence, the image composited in frame buffer 330 may contain both the pixel information of the image and pixel information of the region of interest.

Note that to composite a magnified view of the region of interest, composite engine 325 does not have to transfer the relevant pixel information to an application (e.g., a zoom application) external to window manager 320. All pixel information, including protected content, is kept by window manager 320 while composite engine 325 processes the pixel information. Other applications running on the computing system may not be allowed to access the pixel information, including protected content, of the content from content providing application 310. As such, other applications external to window manager 320 can be prevented from copying or reproducing the protected content. Contrary to some conventional approach, which causes display device 340 to display a checkerboard pattern on at least a portion of the magnified region of interest in order not to expose the protected content to applications external to window manager 320, the above approach faithfully reproduces a magnified image of the region of interest without compromising security. Furthermore, window manager 320 does not have to request pixel information 315 from content-providing application 310 again in order to magnify the region of interest. As such, the overall efficiency of image manipulation using the above approach can be improved over the conventional approach.

Figure 3C:
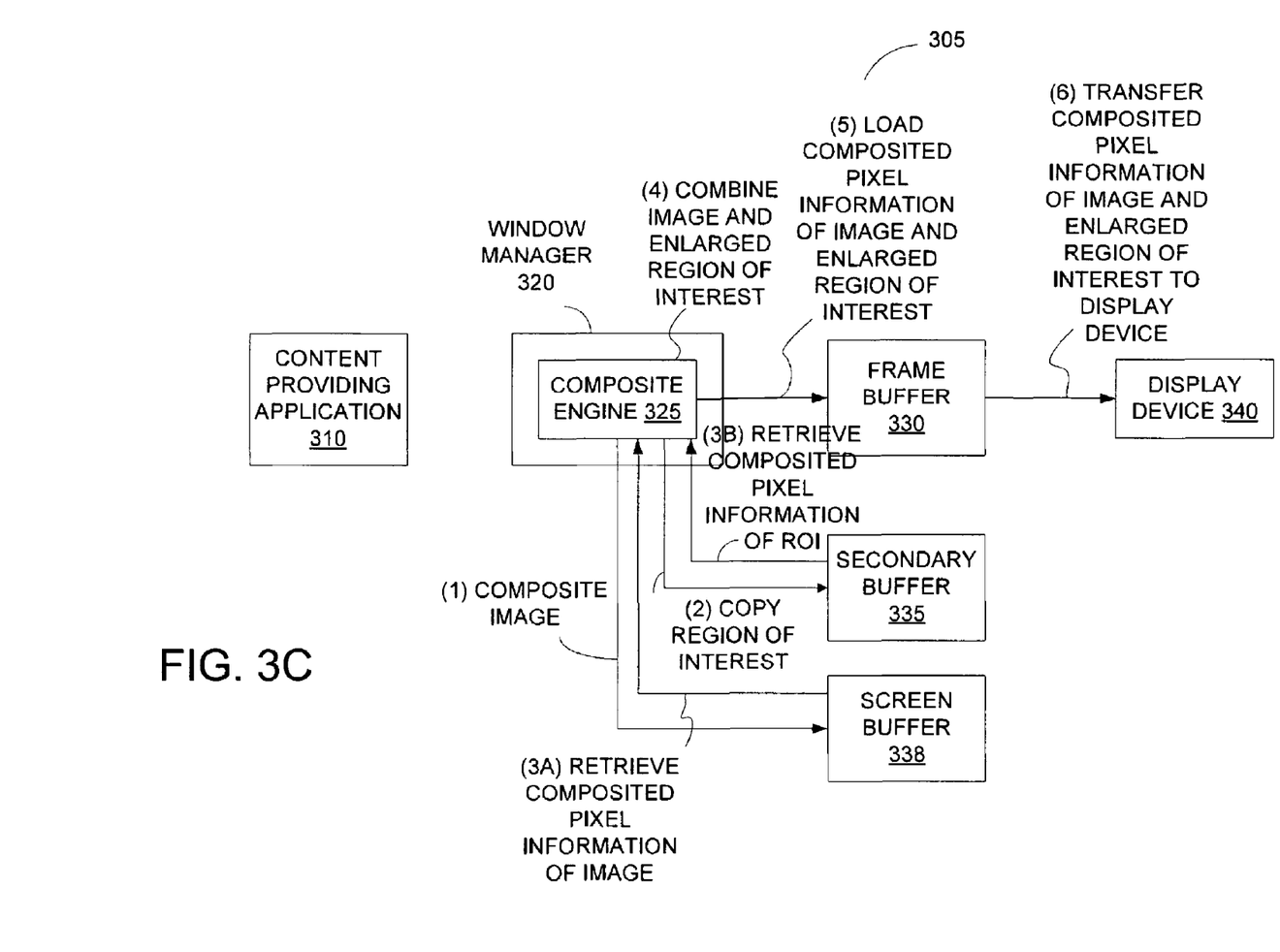
FIG. 3C illustrates an alternate embodiment of an architecture to manipulate an image from a content providing application.

FIG. 3C illustrates an alternative embodiment of architecture to manipulate an image from a content providing application. The architecture 305 includes a content providing application 310, a window manager 320 including a composite engine 325, a frame buffer 330, a secondary buffer 335, a screen buffer 338, and a display device 340. The architecture 305 may be implemented on a computing system, such as, for example, a server, a personal computer, a laptop computer, a handheld multi-functional device (e.g., a personal digital assistant, a smart phone, etc.), a portable or handheld digital media player, etc. One exemplary embodiment of a computing system is shown in details in FIG. 7.

In some embodiments, composite engine 325, running on window manager 320, may receive a request to zoom into a region of interest within an image. In response, composite engine 325 can composite pixel information of the image in screen buffer 338 (1). Then composite engine 325 can copy pixel information of the region of interest into secondary buffer 335 (2). As discussed above, the secondary buffer 335 may be referred to as a zoom buffer. Composite engine 325 may retrieve composited pixel information of the image from screen buffer 338 (3A) and pixel information of region of interest from secondary buffer 335 (3B). Composite engine 325 can combine the pixel information retrieved from screen buffer 338 and secondary buffer 335 to composite a final image to be displayed (4). The final image may include an enlarged view of the region of interest overlaid on the image. Composite engine 325 loads frame buffer 330 with composited pixel information of the final image (5). From frame buffer 330, composited pixel information may be transferred to display device 340 to display the final image (6).

In some embodiments, multiple secondary buffers are provided to display multiple enlarged views of multiple regions of interest in a final image and/or to display multiple enlarged views of a single region of interest. The region(s) of interest may be enlarged by the same scale or different scales. For example, in the top left corner of a final image, an enlarged view of a first region of interest is displayed at 2× magnification, and in the top right corner of the final image, an enlarged view of a second region of interest is displayed at 5× magnification. Note that the first and the second regions of interest may be the same region of interest or different regions of interest.

Figure 4:
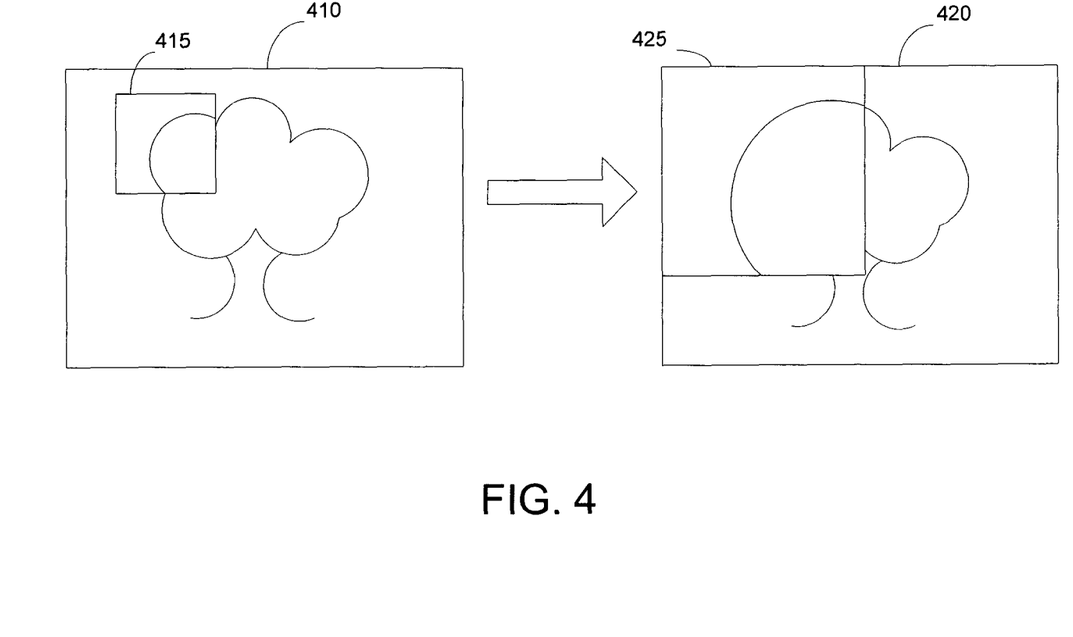
FIG. 4 illustrates an exemplary embodiment of an image magnified according to some embodiments of the invention.

FIG. 4 illustrates an exemplary embodiment of an image magnified according to some embodiments of the invention. On the left hand side of FIG. 4, an exemplary image 410 displayed in a display region on a display device of a computing system according to some embodiments of the method discussed above with reference to FIG. 3A is illustrated. In the current example, a user of the computing system may define a region of interest 415 within image 410, and then request to zoom into the region of interest 415. In response, a composite engine running on a window manager in the computing system may composite pixel information of the region of interest 415 in a secondary buffer, and then composite pixel information of a final image 420 (as shown on the right hand side of FIG. 4), which includes an enlarged view of the region of interest 415, in a frame buffer using the pixel information of the region of interest 415 from the secondary buffer. With the composite engine compositing the region of interest in the secondary buffer, any protected content in the pixel information of the region of interest would not be transferred outside of window manager. As such, unauthorized copying or reproducing of protected content by third party applications outside of window manager can be prevented.

In some embodiments, the magnified region of interest 425 is displayed on part of the display region of the display device, overlaying on the original image 410 to form a new image 420. In the current example, the magnified region of interest 425 is overlaid on the left upper corner of the original image 410, which still occupies the entire display region on the display device. In other embodiments, the region of interest 425 may be overlaid on other locations within the original image 410. Alternatively, the magnified region of interest may be large enough to occupy the entire display region, and hence, only the magnified region of interest is displayed (i.e., the original image 410 is no longer displayed).

Figure 5:
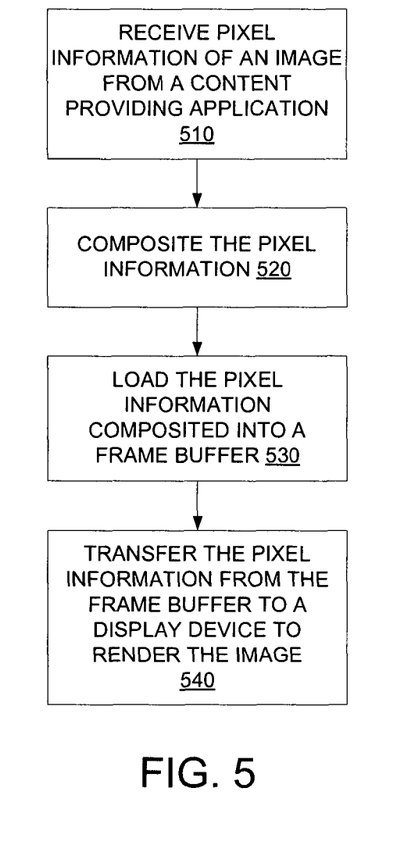
FIG. 5 is a flow chart of one embodiment of a method to display an image from a content providing application.

FIG. 5 is a flowchart of one embodiment of a method to display an image from a content providing application. The method may be performed by processing logic that includes hardware, software, firmware, or a combination of any of the above. For example, the method illustrated in FIG. 5 may be performed at least in part by a window manager running on a graphics processing device.

In some embodiments, processing logic of an image from a content providing application (processing block 510). Then processing logic composites the pixel information to put it into a format suitable for a frame buffer to prepare for rendering the image (processing block 520). The pixel information may include protected content associated with the image, such as DRM information, and an indicator to indicate that such information is protected.

After compositing the pixel information, processing logic loads the composited pixel information into the frame buffer (processing block 530). Then processing logic transfers the pixel information from the frame buffer to a display device to render the image (processing block 540).

While the image is being displayed, a user viewing the image may desire to zoom into a particular region within the image (hereinafter, referred to as the region of interest). In response, processing logic may magnify the region of interest. However, in order to avoid exposing any protected content within the pixel information corresponding to the region of interest, as well as improving the speed or performance of the magnification operations, processing logic may keep the magnification operations within the paths between the frame buffer and the composite engine, without requesting the pixel information of the region of interest from the content providing application again. Detail of one embodiment of a method to magnify the region of interest is described below.

Figure 6:
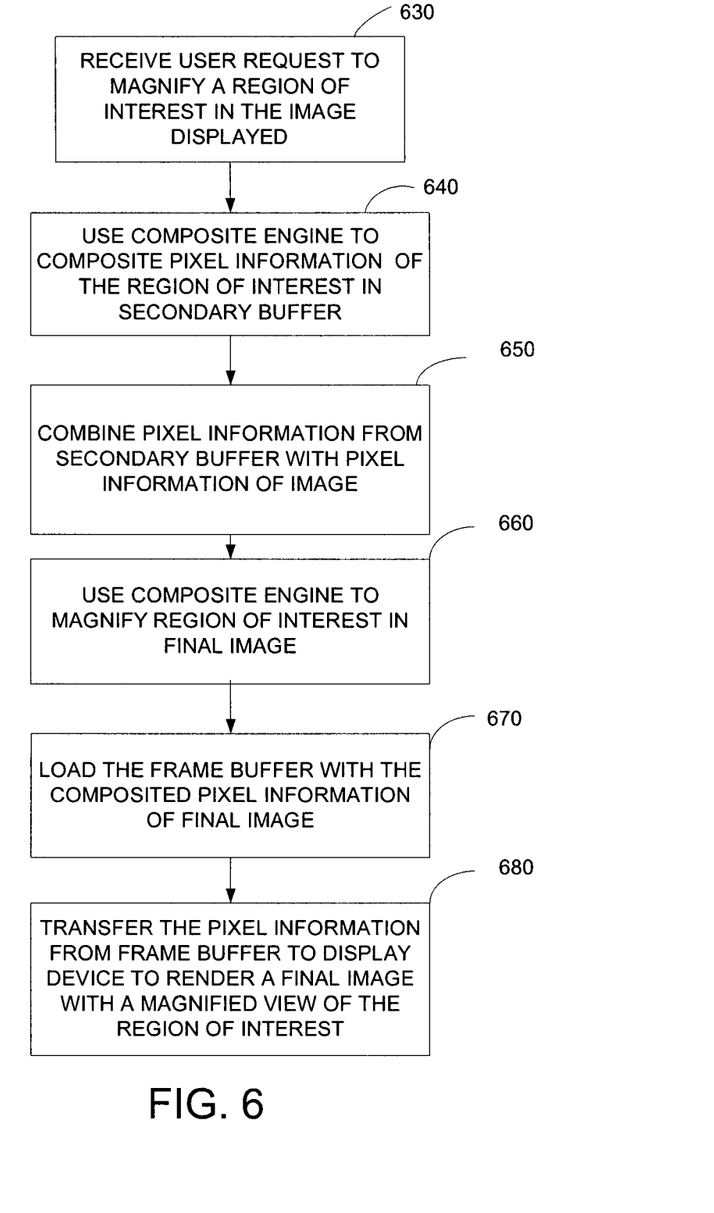
FIG. 6 is a flowchart of one embodiment of a method to manipulate an image from a content providing application.

FIG. 6 is a flowchart of one embodiment of a method to manipulate an image from a content providing application without exposing protected content outside of a window manager. The method may be performed by processing logic that includes hardware, software, firmware, or a combination of any of the above. For example, the method illustrated in FIG. 6 may be performed at least in part by a composite engine of a window manager running on a graphics processing device.

In some embodiments, processing logic receives a user request to magnify a region of interest within an image (processing block 630). The image is rendered using pixel information previously supplied from a content providing application. One embodiment of a method to render the image has been described above. In response to the user request, processing logic uses the composite engine to composite pixel information of the region of interest in a secondary buffer (processing block 640). Note that processing logic does not request the pixel information of the region of interest from the content providing application again, rather, processing logic uses the pixel information locally available in the frame buffer. Thus, the overall speed of the magnification operations can be improved.

Using the composite engine, processing logic combines the pixel information of the image with the pixel information of the region of interest from the secondary buffer in order to generate a final image (processing block 650). In some embodiments, processing logic may further perform other operations to manipulate the region of interest before or during re-composition of the pixel information. Some examples include filtering, dithering, contrast enhancement, or other image enhancement operations.

In some embodiments, the pixel information includes protected content associated with the image, such as DRM information. For example, the protected content may include copyrighted images, which should not be copied or reproduced without prior consent of the copyright owner. The pixel information may further include an indicator (e.g., a flag) to indicate to processing logic that such content is protected. Processing logic may use composite engine to magnify the region of interest in the final image (processing block 660). By using the composite engine to magnify the region of interest, processing logic may avoid exposing the protected content to applications outside of the window manager. Then processing logic loads the composited pixel information into the frame buffer (processing block 670). Finally, processing logic transfers the composited information from the frame buffer to the display device to render a final image having a magnified view of the region of interest on the display device (processing block 680).

One should appreciate that the techniques discussed above can be used to manipulate an image in other ways in addition to, or in alternative to, zooming into the image. For example, the above techniques can be used to duplicate a portion of an image at a new location in response to a user request.

Figure 7:
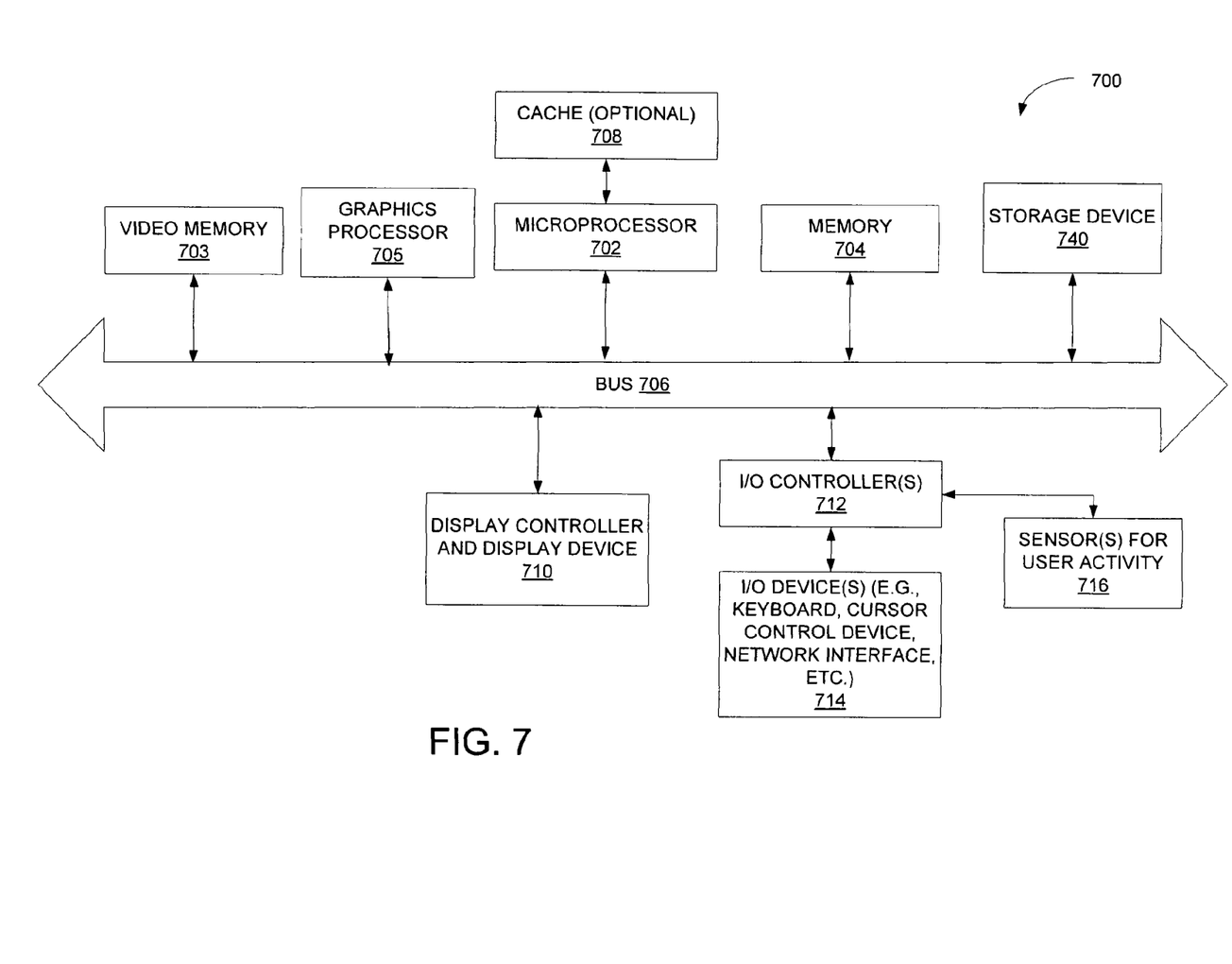
FIG. 7 shows one embodiment of a device usable in some embodiments of the present disclosure.

FIG. 7 shows one embodiment of a device usable in some embodiments of the disclosure. This device 700 may include a processing device, such as microprocessor 702, a video memory 703, a memory 704, and a graphics processor 705 (also commonly referred to as a graphics processing device or graphics processing unit (GPU)), which are coupled to each other through a bus 706. The device 700 may optionally include a cache 708, which is coupled to the microprocessor 702. The device may optionally include a storage device 740 which may be, for example, any type of solid-state or magnetic memory device. Storage device 740 may be or include a machine-readable medium.

In some embodiments, device 700 includes a memory 704 and a video memory 703. The memory 704 and video memory 703 may be implemented with one or more computer-readable storage devices, such as Random Access Memory (RAM), static Random Access Memory (SRAM), flash memory, etc. The video memory 703 may be dedicated for holding data and/or instructions related to graphics and image processing, whereas the memory 704 may be used for holding other data and/or instructions not directly related to graphics and image processing. Generally speaking, the video memory 703 may allow faster access of data by video processor 705. For example, frame buffer 330 in FIGS. 3A and 36 described above may be stored on video memory 703.

This device 700 may also optionally include a display controller and display device 710, which is coupled to the other components through the bus 706. The display device 710 may include a liquid crystal display (LCD), a cathode ray tube (CRT), or a touch screen, etc. One or more input/output controllers 712 are also coupled to the bus 706 to provide an interface for input/output devices 714 and to provide an interface for one or more sensors 716 which are for sensing user activity. The bus 706 may include one or more buses connected to each other through various bridges, controllers, and/or adapters as are well known in the art. The input/output devices 714 may include a keypad or keyboard or a cursor control device such as a touch input panel. Furthermore, the input/output devices 714 may include a network interface, which is either for a wired network or a wireless network (e.g. an RF transceiver). The sensors 716 may be any one of the sensors described herein including, for example, a proximity sensor or an ambient light sensor. In at least certain implementations of the device 700, the microprocessor 702 may receive data from one or more sensors 716 and may perform the analysis of that data in various ways. In some embodiments, device 700 includes a graphics processor 705 dedicated for processing instructions and analyzing data related to graphics and image processing in the manner described herein. For example, composite engine 325 in FIGS. 3A and 3B described above may be executed on the video processor 705.

In certain embodiments of the present disclosure, device 700 can be used to implement at least some of the methods discussed in the present disclosure.

In the foregoing specification, the disclosure has been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A machine-readable storage medium that provides instructions that, if executed by a processor, will cause the processor to generate an application programming interface (API) that allows an API-implementing component to perform operations, the operations comprising:
    receiving, by a composite engine in a window manager of a computing system, from a content-providing application, pixel information of a first image of content for display, wherein the window manager operates in a memory space reserved for use by the window manager that is independent of memory space used by the content-providing application;
    receiving, by the window manager, from the content-providing application, digital right management (DRM) information associated with at least a portion of the pixel information, wherein the at least a portion of the pixel information is associated with protected content within the first image of content;
    receiving, by the window manager, a selection of a region of interest within the first image;
    enhancing, by the composite engine, the region of interest in a buffer within the memory space reserved for the window manager;
    compositing, by the composite engine, the region of interest within the first image with at least part of the pixel information of the first image previously provided to the window manager, in a buffer within the memory space reserved for the window manager;
    compositing, by the composite engine, a second image with the region of interest composited and the pixel information of the first image in a buffer within the memory space reserved for the window manager, the second image including the enhanced version of the region of interest; and
    transferring the pixel information of the composited second image and first image to a frame buffer for output to a display, the frame buffer within the memory space reserved for the window manager.

2. The machine-readable storage medium of claim 1, wherein the operations further comprise:
    loading the region of interest composited into a secondary buffer; and
    loading the second image composited into a frame buffer separate from the secondary buffer.

3. The machine-readable storage medium of claim 1, wherein the composite engine operates on the set of pixel information solely in a first section of memory space in a storage system within the computing system, wherein the first section of memory space is reserved for use by the composite engine and is independent of a second section of memory space in the storage system reserved for use by one or more applications running on the computing system.

4. The machine-readable storage medium of claim 1, wherein the enhancement includes at least one of zooming or contrast enhancement.

5. A computer-implemented method, comprising:
    receiving, by a window manager of a computing system, pixel information of a first image from a content-providing application;
    receiving, by the window manager, from the content-providing application, digital right management (DRM) information associated with at least a portion of the pixel information of the first image, wherein the at least a portion of the pixel information is associated with protected content within the first image;
    receiving, by the window manager, a selection of a region of interest within the first image, in response to a user request of a computing system to enhance the region of interest within the first image;
    enhancing, by a composite engine in the window manager, the region of interest;
    compositing, by the composite engine, the region of interest within the first image with at least part of the pixel information of the first image previously provided to the window manager, keeping the at least a portion of the pixel information of the region of interest associated with DRM information and protected content within the window manager while enhancing the region of interest;
    compositing, by the compositing engine, a second image with the region of interest composited and the pixel information of the first image, the second image including the enhanced version of the region of interest; and
    transferring, by the window manager, pixel information of the composited second image and the pixel information of the first image to a frame buffer for output to a display.

6. The method of claim 5, further comprising:
    preventing one or more applications running outside of the window manager on the computing system from accessing the pixel information of the region of interest.

7. The method of claim 5, further comprising:
    wherein enhancing the region of interest comprises enlarging the region of interest in a display device of the computing system.

8. The method of claim 7, wherein displaying the enlarged view of the region of interest on the display device comprises:
    overlaying the enlarged view of the region of interest on a portion of the image on the display device.

9. The method of claim 5, wherein the composite engine zooms into the region of interest without requesting additional pixel information from a user application that has originally provided pixel information of the image.

10. An apparatus, comprising:
    a computer-readable storage device configured to store a frame buffer and a secondary buffer; and a graphics processing device, coupled to the computer-readable storage device, the graphics processing device configured to:
  receive, from a content-providing application, pixel information of a first image of content for display;
  receive, from the content-providing application, digital right management (DRM) information associated with at least a portion of the pixel information, wherein the at least a portion of the pixel information is associated with protected content within the first image of content;
  receive a selection of a region of interest within the first image;
  enhance the region of interest within the first image in the secondary buffer, while keeping pixel information associated with the protected content within the secondary buffer;
  composite the enhanced region of interest within the first image in the secondary buffer, and to composite a second image, which includes a copy of the enhanced region of interest, in the frame buffer using pixel information retrieved from the secondary buffer.

11. The apparatus of claim 10, further comprising:
a processing device, wherein the frame buffer and the secondary buffer reside in a first section of memory space in the computer-readable storage device reserved for use by the composite engine, and the first section of memory space is independent of a second section of memory space in the computer-readable storage device reserved for use by one or more applications running on the processing device.

12. The apparatus of claim 11, wherein the graphics processing device keeps at least the portion of the pixel information associated with protected content within the first section of memory space while compositing the enhanced region of interest and the second image.

13. The apparatus of claim 10, wherein the graphics processing device further performs filtering on the pixel information to enhance the copy of the region of interest in the second image.

14. The apparatus of claim 10, wherein the copy of the enhanced region of interest in the second image is an enlarged copy of the region of interest.

15. A computer-readable storage medium storing executable program instructions which when executed by a data processing system cause the data processing system to perform a method, the method comprising:
  receiving, by a composite engine running in a window manager in the data processing system, pixel information of an image of content from a content-providing application;
  receiving, by the window manager, from the content-providing application, digital rights management (DRM) information associated with at least a portion of the pixel information, wherein the at least a portion of the pixel information is associated with protected content;
  magnifying, by the composite engine, a region of interest within the image displayed on a display device without requesting pixel information of the region of interest from the content-providing application that has previously provided the image to the window manager, while keeping the at least a portion of the pixel information associated with protected content within the window manager; and
  preventing applications running outside of the window manager from accessing the at least a portion of the pixel information of the region of interest associated with protected content and DRM information while magnifying the region of interest.

16. The method of claim 15, wherein magnifying the region of interest comprises:
  compositing, by the composite engine, the pixel information of the region of interest in a secondary buffer.

17. The method of claim 16, further comprising:
  combining, by the composite engine, the pixel information from the secondary buffer and pixel information of the image to composite a second image; and
  loading the second image composited into a frame buffer.

18. The method of claim 17, further comprising:
  transferring the second image composited from the frame buffer to a display device.

19. The method of claim 18, further comprising:
  displaying the second image on the display device, wherein the second image comprises the magnified region of interest overlaid on a portion of the image.

20. A computer-implemented method, comprising:
  receiving, by a window manager running on a computing system, from a content-providing application, pixel information of a first image of content to display, wherein at least a portion of the pixel information is associated with protected content, and the window manager operates in a memory space reserved for use by the window manager that is independent of memory space reserved for use by the content-providing application;
  transferring the pixel information of the first image to a frame buffer within the address space reserved for use by the window manager;
  receiving, by the window manager, from a content-providing application, pixel information of a second image of content and storing the pixel information of the second image in a secondary buffer within the address space reserved for use by the window manager;
  reading, by the window manager, pixel information of the first image from the frame buffer;
  compositing, by a composite engine running within the window manager, the pixel information of the first image and the pixel information of the second image in the secondary buffer to generate a composited image having pixel information;
  transferring, by the window manager, the pixel information of the composited image from the secondary buffer to the frame buffer.

* * * * *